May 4, 1926.
A. P. SAYERS
1,583,609
BATTERY BOX AND CIRCUIT LOCK
Filed June 13, 1925
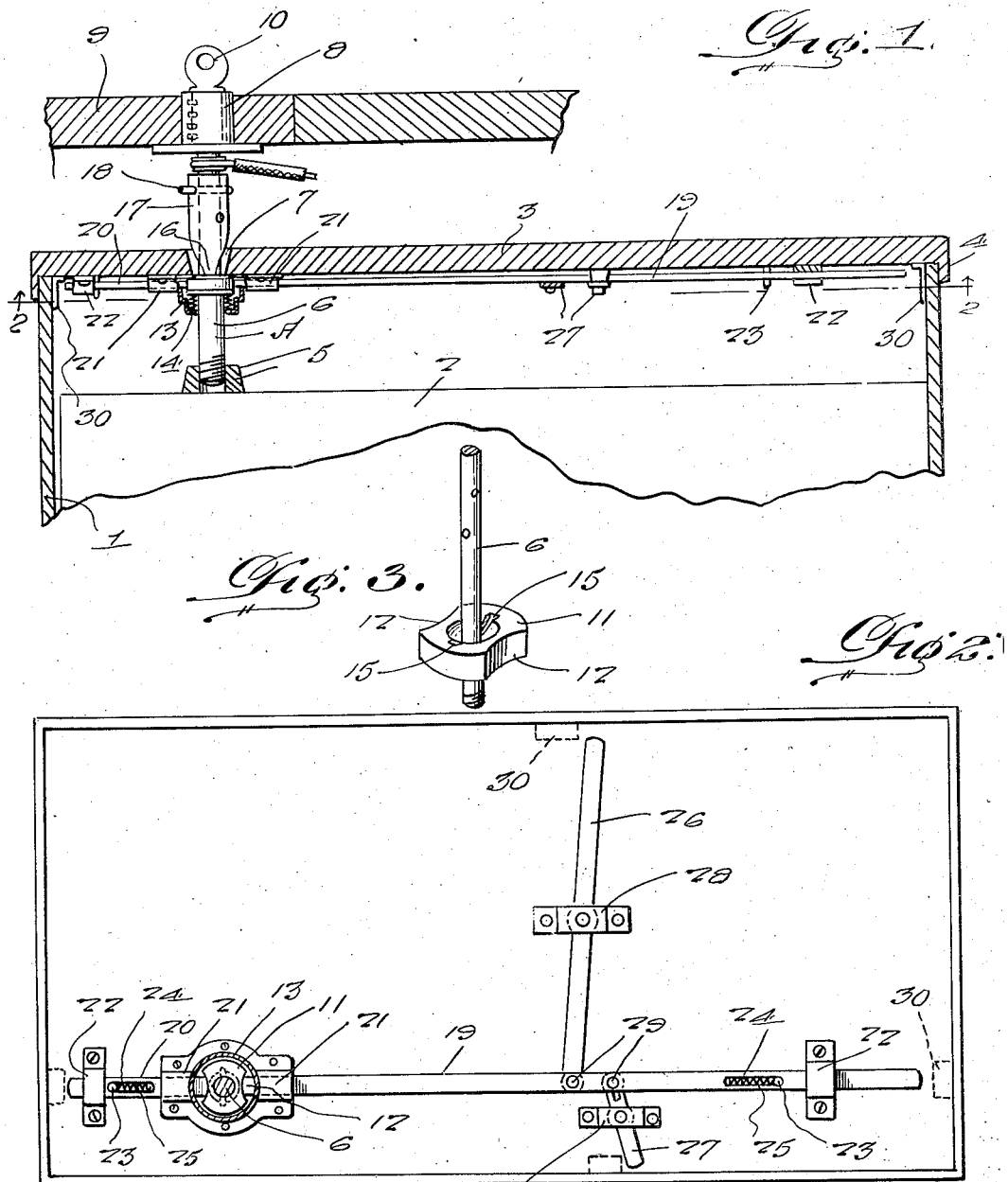
Inventor
A. P. Sayers,
By
Clarence O'Brien
Attorney Patented May 4, 1926.

1,583,609

UNITED STATES PATENT OFFICE.

AUGUSTUS P. SAYERS, OF NORTH TAZEWELL, VIRGINIA.

BATTERY BOX AND CIRCUIT LOCK.

Application filed June 13, 1925. Serial No. 36,999.

*To all whom it may concern:*

Be it known that I, AUGUSTUS P. SAYERS, a citizen of the United States, residing at North Tazewell, in the county of Tazewell and State of Virginia, have invented certain new and useful Improvements in Battery Boxes and Circuit Locks, of which the following is a specification.

This invention relates to a locking mechanism for batteries and particularly for automobile storage batteries for locking the battery in a closed container and at the same time controlling the circuit from said battery in accordance with the position of the lock.

An object of the invention resides in providing a container for batteries, preferably storage batteries, such as used in automobiles, which is provided with a removable cover, having suitable mechanism mounted thereon and adapted for cooperation with portions of the housing for locking the cover on the housing, means being provided for simultaneously operating the locking mechanism, and at the same time controlling the circuit to the battery within the housing.

The invention further comprehends other objects and improvements in the details of construction and arrangement of parts in carrying out the invention, which are more particularly pointed out in the following detailed description, and in the claims directed to a preferred form of the invention, it being understood, however, that various changes in the size, shape and arrangement of the parts may be made, without departing from the spirit or scope of the invention as hereinafter set forth.

Figure 1 is a vertical sectional view, through a portion of a battery box, and the cover therefor, showing the upper end of the battery in the box, also a section through the floor board of an automobile illustrating the position of the locking means therein.

Figure 2 is a sectional view, taken on the line 2—2 of Figure 1.

Figure 3 is a disassembled perspective view of the battery terminal engaging member, the cam member for operating the lock bar secured to the cover.

A battery box is indicated at 1, which is open at the upper end and receives the battery 2 therein, above which considerable space is left between the top of the battery and the open end of the box or casing 1. A cover 3 is removably mounted on the upper end of the casing 1 and is provided with the downwardly extending flanges 4, engaging around the outside of the battery casing or housing. The positive terminal of the battery is indicated at 5, with which is removably associated a terminal rod 6 provided with small pitch screw threads adapted to engage corresponding threads in the terminal 5. This threaded connection is of such a character, that a relatively small rotating movement of the battery terminal rod will be sufficient to disengage or to engage the same with the battery terminal for controlling the circuit through the battery. This rod extends upwardly through an opening 7 in the cover 3 and at the upper end is connected with the lock 8 which is mounted in the floor board 9 by a suitable means, so that upon the operation of the key 10, the rotation of the key approximately one turn will operate the battery terminal rod 6, so as to withdraw the same from the battery terminal 5 and disconnect the circuit to said battery.

A cam member 11, having arcuate recesses 12 at diametrically opposite points thereof is mounted on the terminal rod 6 and held thereon against rotation, but permitted to have sliding movement relative to said rod. This cam member 11 is mounted for rotative movement in the housing 13 on the bottom side of the cover 3 and normally held in raised position by coil springs 14 positioned between the cam member and the housing. This cam member 11 is formed with radial recesses 15, which disengageably receive the fingers 16 formed at opposite points on the cylindrical member 17 movably mounted on the terminal rod 6 above the cover 3 and projecting through the opening 7 therein, which cylindrical member is normally held in one of a plurality of different positions of adjustment by the pin 18, removably extending through aligned openings in the rod 6 and member 17. The cylindrical member 17 is positioned on the terminal rod 6 in such a manner that the fingers of the cylindrical member 17 will engage in the slots 15 throughout one quarter turn of the device in a predetermined manner for locking or unlocking suitable means for retaining the cover on the casing. This locking means for the cover includes a pair of bar members 19 and 20 respectively, of the locking bars 19 and 20 being arranged in alignment and having the adjacent ends slidably mounted in the guide ways 21, forming part of the casing 13, while the bar 19 is substantially longer than the bar 20. Suitable guide brackets 22 form supports for and means for guiding the other ends of the bars 19 and 20, while pins 23 extend through slots 24 in each of said bars and form an abutment for coil springs 25 mounted within said slots normally adapted to project the bar against the periphery of the cam member 11, which controls the projection or retraction of the said bars. Locking levers are indicated at 26 and 27 respectively, which are pivotally mounted in the brackets 28, secured to the under side of the cover 3, and pivotally connected at 29 at one end to the bar 19, the connection being of the pin and slot type, to permit free movement of the bar 19, as well as the locking levers 26 and 27 on their pivot mountings. A plurality of locking lugs of angular form, indicated at 30, are secured adjacent the upper end of the casing 1, on the various sides thereof for cooperation with the locking bars 19 and 20 and the locking levers 26 and 27.

Upon the rotation of the cam 11 from the position shown in Figure 2, to a position substantially at right angles thereto, it will be seen that the locking bars 19 and 20 will be moved away from each other and the free ends projected to engage the locking lugs 30 on the casing 1, for locking the cover on the box and preventing access to the batteries. During the movement of the bar 19, the locking levers 26 and 27 will also be moved on their pivot mountings so that the free ends will engage under the locking lugs 30, associated therewith, so that the cover is locked on all four sides of the casing, making it difficult to remove and substantially preventing the theft of the battery.

The pin 18 is removably associated with the cylindrical member 17 and the terminal rod 6 so that the same may be removed and engaged in other openings to be aligned between the cylindrical member and the terminal rod 6, so that the cylindrical member may be raised, to be at all times disengaged from contact in the slots 15 of the cam members, so that after the box is once locked, the cylindrical member may be raised and the terminal post engaged and disengaged with the terminal 5 of the battery, without locking and unlocking the cover from the box upon each operation of the terminal rod.

From the foregoing description, it will be seen that a convenient and efficient means is provided for securely locking a battery within a housing to prevent the theft thereof and at the same time providing means associated with the means for locking the battery in the box, for making and breaking the circuit supplied with current by the battery, to prevent the theft of automobiles, by entirely cutting off the supply of current from the various distribution systems of the automobile.

Various changes in the size, shape and arrangement of parts may be made without departing from the spirit of the invention or the scope of the appended claims.

What is claimed is:

1. A device of the class described comprising a casing for receiving a battery, a cover for said casing, a contact bar movably mounted in said cover and adapted for detachable engagement with the terminal on said battery, locking members mounted on the cover for cooperation with the casing to lock the cover thereon, and key controlled means for operating said locking members and terminal bar for locking the cover on the casing and locking said terminal bars in disengaged relation with the terminal of the battery.

2. A device of the class described comprising a casing for receiving a battery, a cover removably associated with said casing, locking means mounted on the cover and adapted for engagement with the casing for locking the cover thereon, a terminal bar movably mounted in the cover for detachable cooperation with said terminal of the battery for controlling the circuit to the battery, means operated in the movement of the terminal bar for operating the locking means on the cover, and key controlled means for operating said terminal bar to move the same to engaged or disengaged relation with the terminal of the battery for operating said locking means.

In testimony whereof I affix my signature.

AUGUSTUS P. SAYERS.